No. 763,824. Patented June 28, 1904.

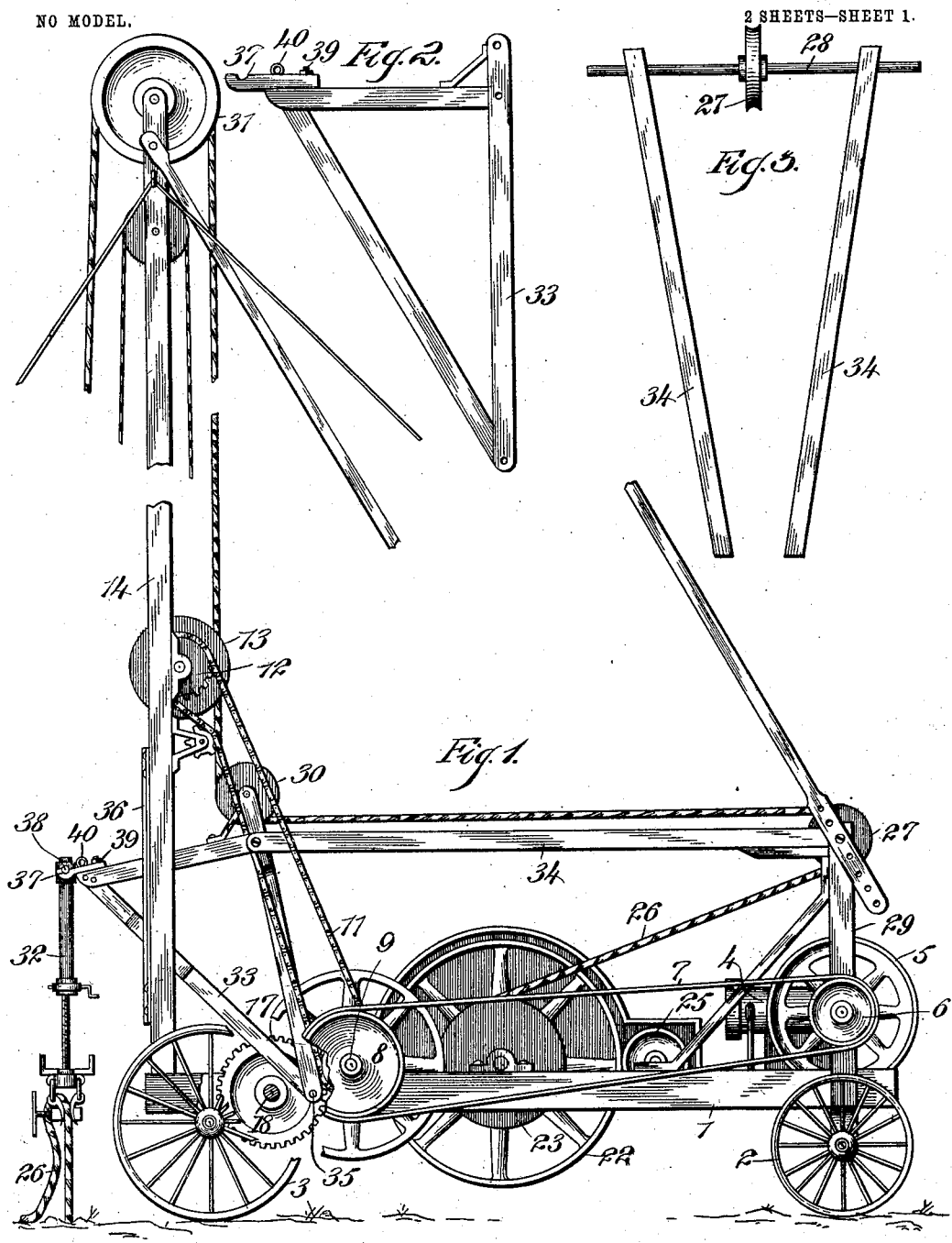

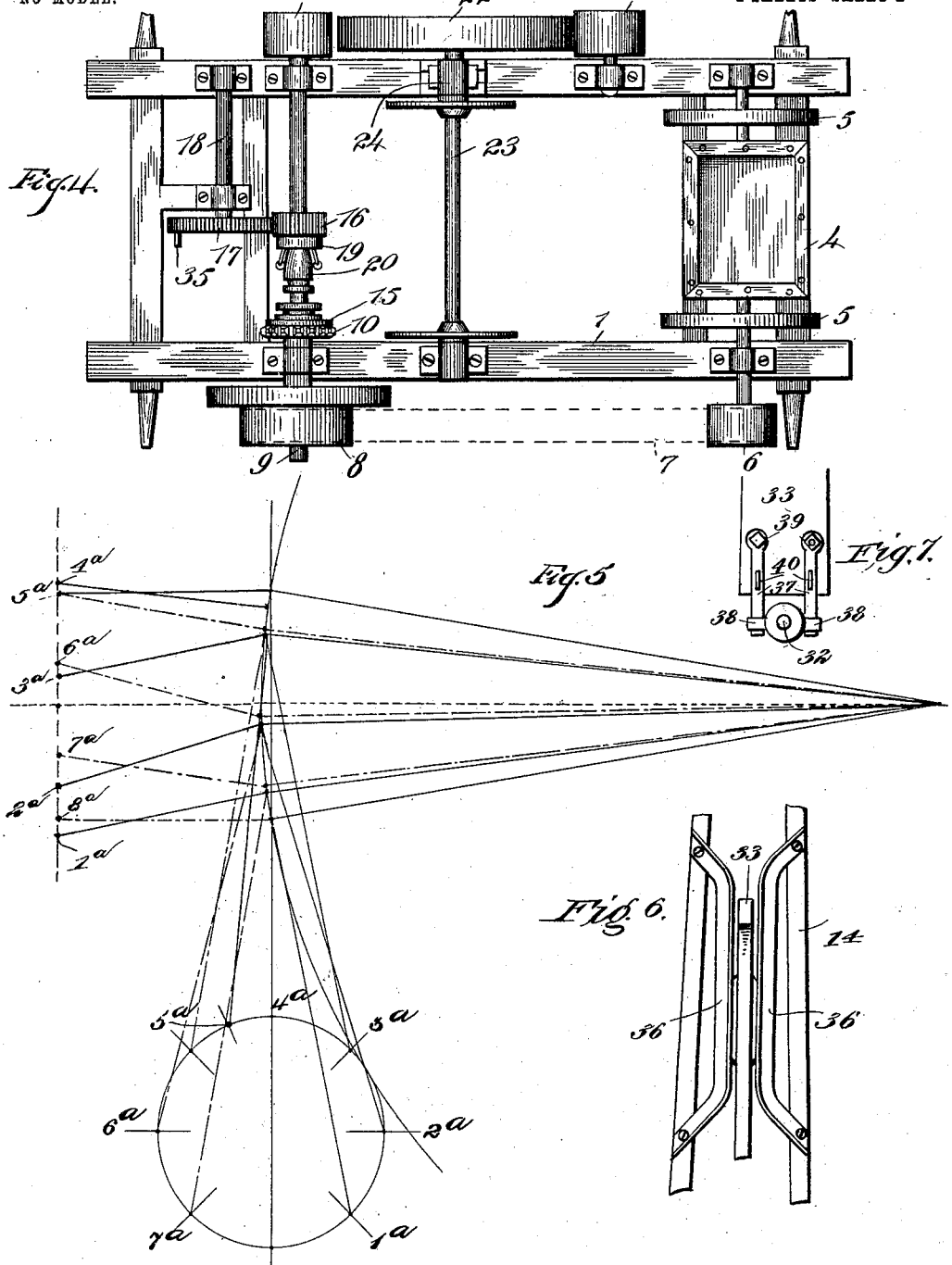

UNITED STATES PATENT OFFICE.

HUGH H. WILBURN, OF NORTH YAKIMA, WASHINGTON.

WELL-DRILLING MACHINE.

SPECIFICATION forming part of Letters Patent No. 763,824, dated June 28, 1904.

Application filed October 31, 1903. Serial No. 179,315. (No model.)

*To all whom it may concern:*

Be it known that I, HUGH H. WILBURN, a citizen of the United States, and a resident of North Yakima, in the county of Yakima and State of Washington, have invented a new and Improved Well-Drilling Machine, of which the following is a full, clear, and exact description.

This invention relates to improvements in machines for drilling wells, and it particularly relates to an improved and novel construction of walking-beam for operating the tools, a main object being to provide a walking-beam with which a gasolene or steam engine may be successfully used for well-drilling, so shaped and hung as to cause the drilling-tool to move in direct perpendicular lines, thus preventing the rope or cable from rubbing against the sides of the well and wearing the rope or cable away.

I will describe a well-drilling machine embodying my invention and then point out the novel features in the appended claims.

Reference is to be had to the accompanying drawings, forming a part of this specification, in which similar characters of reference indicate corresponding parts in all the figures.

Figure 1 is a side elevation of a well-drilling machine embodying my invention. Fig. 2 is a side view of the walking-beam employed. Fig. 3 is a plan view of the beam-carrier. Fig. 4 is a plan view of the machine with the upper structure and the supporting-wheels removed. Fig. 5 is a diagram illustrating the movements of the walking-beam. Fig. 6 is a front view of certain guides, and Fig. 7 is a detail plan showing temper-screw-supporting hooks employed.

Referring to the drawings, 1 designates the frame of the machine, mounted on the front wheels 2 and rear wheels 3 in the usual manner. Supported at the front end of the frame is a gasolene-engine 4, on the shaft of which are balance-wheels 5. Also on this shaft is a pulley 6, from which a band 7 extends to a driving-pulley 8 on a shaft 9, having bearings in boxes on the frame. Loosely mounted on the shaft 9 is a sprocket-wheel 10, from which a chain 11 extends to a sprocket-wheel 12 on the shaft of a sand-drum 13, the said sand-drum shaft having its bearings in boxings attached to the uprights 14 on the rear end of the machine.

The sprocket-wheel 10 to operate the sand-drum is designed to be driven at intervals by the shaft 9. As a means for causing the movement of the sprocket-wheel with its shaft I provide it with a friction clutch member designed to be engaged by a clutch member 15, movable lengthwise of said shaft, but rotating therewith. This clutch member 15 may be engaged with the sprocket-wheel by the usual shifting lever.

Also loosely mounted on the shaft 9 is a pinion 16, engaging with a gear-wheel 17 on a counter-shaft 18. The pinion 16 is provided with a clutch member 19, designed to be engaged by a clutch member 20, mounted on the shaft 9 and designed to rotate therewith, but movable longitudinally thereof and shifted in the usual manner.

Attached to the shaft 9 is a friction-pulley 21, designed to be engaged with a friction-wheel 22 on the shaft of a rope or cable drum 23. The shaft of this drum 23 has its bearings in a shifting box 24, so that the wheel 22 may be moved into engagement with the pulley 21 when it is desired to raise the tool from the well, or it may be shifted into engagement with a brake, here shown as a pulley 25, for holding the drum stationary. A rope or cable 26 extends from the drum 23 over an idler 27 at the forward end of the machine and attached to a shaft 28, having bearings in uprights 29. From the idler 27 the rope extends around a pulley 30, having bearings in the upper portion of the walking-beam, to be hereinafter described, and from this pulley 30 the rope extends over a sheave 31 at the upper end of the uprights 14 and thence to the temper-screw 32.

The walking-beam 33 in of triangular shape, and at its upper forward portion it has swinging connection with a carrier consisting of beams 34, mounted to swing on the shaft 28 and converging toward the walking-beam. The lower end of the walking-beam is connected to a wrist-pin 35 on the gear-wheel 17, and it is guided in its up-and-down movements between guide-bars 36, attached to the uprights 14. These guide-bars obviously will prevent any lateral movement of the walking-beam during its up-and-down movements. At its outer end the walking-beam is provided with hook members 37, designed to receive trunnions 38, attached to the temper-screw. These hooks 37 are mounted to swing on a bolt 39, so that the hooks may be swung laterally when the tool is to be removed from the well. To hold the hooks in position to support the temper-screw over the well, I employ pins 40, which pass through an opening in the block portions of the hooks and into an opening in the walking-beam.

As before stated, a main object of this invention is to cause direct vertical movements, or substantially so, of the walking-beam. In Fig. 5 I have illustrated diagrammatically the up-and-down movements. The end of the beam, beginning at $1^a$, travels up to $4^a$. Then the gear-wheel 17 will have traveled one-eighth of a revolution from $4^a$ to $5^a$, and the end of the walking-beam at this time is stationary, thus giving the tool time to rise. It will be seen by $5^a$, $6^a$, $7^a$, and $8^a$ that when the end of the beam starts down at the proper speed it travels a little ahead of the tool. This gives a free and clear drop, and it will be noted from $8^a$ to $1^a$ that there will be a retard of the beam, which gives the tool time to reach the bottom of the well.

Having thus described my invention, I claim as new and desire to secure by Letters Patent—

1. In a well-drilling machine, a walking-beam of triangular form, a carrier to which the walking-beam is pivoted, and means for causing vertical movements of said walking-beam, substantially as specified.

2. In a well-drilling machine, a triangular walking-beam, a carrier with which the beam has swinging connection, a gear-wheel, a wrist-pin on said wheel for engaging the lower end of the walking-beam, a driving-shaft, a pinion loosely mounted on said shaft for engaging with the gear-wheel, a clutch mechanism for causing movements of the pinion with the shaft, and a motor on the machine for driving said shaft, substantially as specified.

3. In a well-drilling machine, a walking-beam of triangular form, a carrier with which said walking-beam has swinging connection, means for causing the vertical movements of the beam, vertical guides for said beam, and devices on the beam for engaging with a temper-screw, substantially as specified.

4. In a well-drilling machine, a triangular walking-beam, swinging beams carrying said walking-beam, a gear-wheel, a wrist-pin on said wheel engaging with the lower end of the beam, a driving-shaft, a pinion loosely mounted on said shaft, and engaging with the gear-wheel, a clutch on the shaft for causing a rotary movement of the pinion with the shaft, and a gasolene-engine for driving the shaft, substantially as specified.

5. In a well-drilling machine, a triangular walking-beam, a carrier with which the beam has swinging connection, a mechanism for causing vertical movements of the beam, and hook members mounted to swing on the beam, substantially as specified.

6. In a well-drilling machine, a driving-shaft, a gasolene-engine having driving connection therewith, a triangular walking-beam operated from said driving-shaft, a sand-drum, a sprocket-wheel loosely mounted on the driving-shaft, a sprocket-wheel on the shaft of the sand-drum, a chain connecting said two wheels, and a clutch member on the driving-shaft for engaging with the sprocket-wheel, substantially as specified.

In testimony whereof I have signed my name to this specification in the presence of two subscribing witnesses.

HUGH H. WILBURN.

Witnesses:
N. H. GOODENOW,
F. J. HOAGLAND.